United States Patent [19]

McPherson et al.

[11] 4,290,836
[45] Sep. 22, 1981

[54] METHOD OF MAKING COMPOSITE PIPE HAVING AN INTEGRAL BELL END

[75] Inventors: Alex L. McPherson, Winfield, Ill.; Douglas E. Triestram; James E. Lawrence, Jr., both of Coshocton, Ohio

[73] Assignee: Clow Corporation, Oak Brook, Ill.

[21] Appl. No.: 138,160

[22] Filed: Apr. 7, 1980

Related U.S. Application Data

[62] Division of Ser. No. 879,158, Feb. 21, 1978, Pat. No. 4,240,470.

[51] Int. Cl.³ .......................................... B65H 81/00
[52] U.S. Cl. .................................... 156/171; 156/172; 156/173
[58] Field of Search ..................... 138/137, 174, 109; 285/149, DIG. 70, 423; 277/207 A; 156/172, 173, 169, 171, 175

[56] References Cited

U.S. PATENT DOCUMENTS 3,406,724 10/1968 Carlstrom et al. .................. 138/137
3,623,930 11/1971 Grosh et al. ........................ 156/173
3,884,269 5/1975 Schetty et al. ..................... 138/137
4,114,657 9/1978 Langenfeld ........................ 138/109

Primary Examiner—Michael W. Ball
Attorney, Agent, or Firm—Fitch, Even, Tabin, Flannery & Welsh

[57] ABSTRACT

A composite reinforced plastic pipe having an integral bell end and method for making the same are disclosed wherein the composite pipe has a resin impregnated surfacing veil liner, a first resin impregnated continuous fiberglass strand reinforced layer coaxial along the inner liner, a sand-resin core layer formed along the cylindrical portion of the pipe but not on the bell end, a resin impregnated surfacing mat formed coaxially along the length of the exposed first fiberglass strand reinforced layer on the bell end and along the core layer, and an outer resin reinforced roving layer formed coaxially along the full length of the pipe, the composite pipe being cured to form a high strength pipe having uniform radial stiffness and improved resistance to water migration.

6 Claims, 2 Drawing Figures

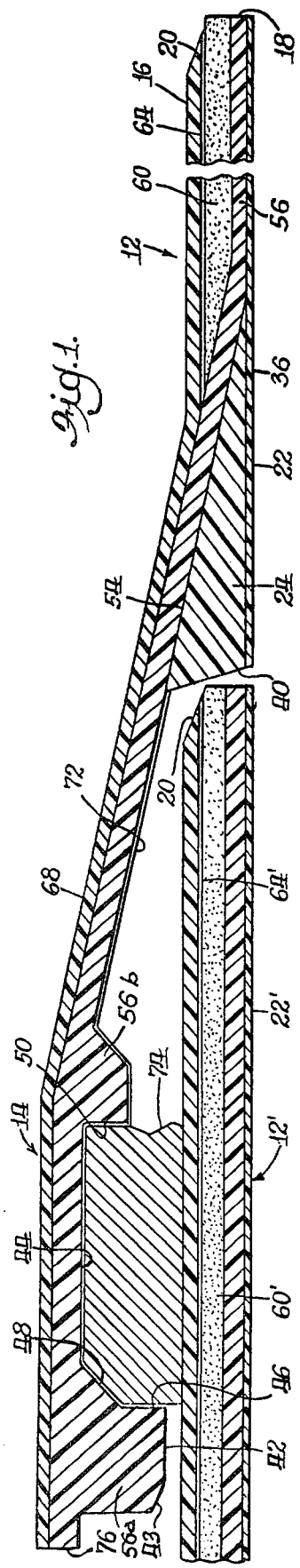
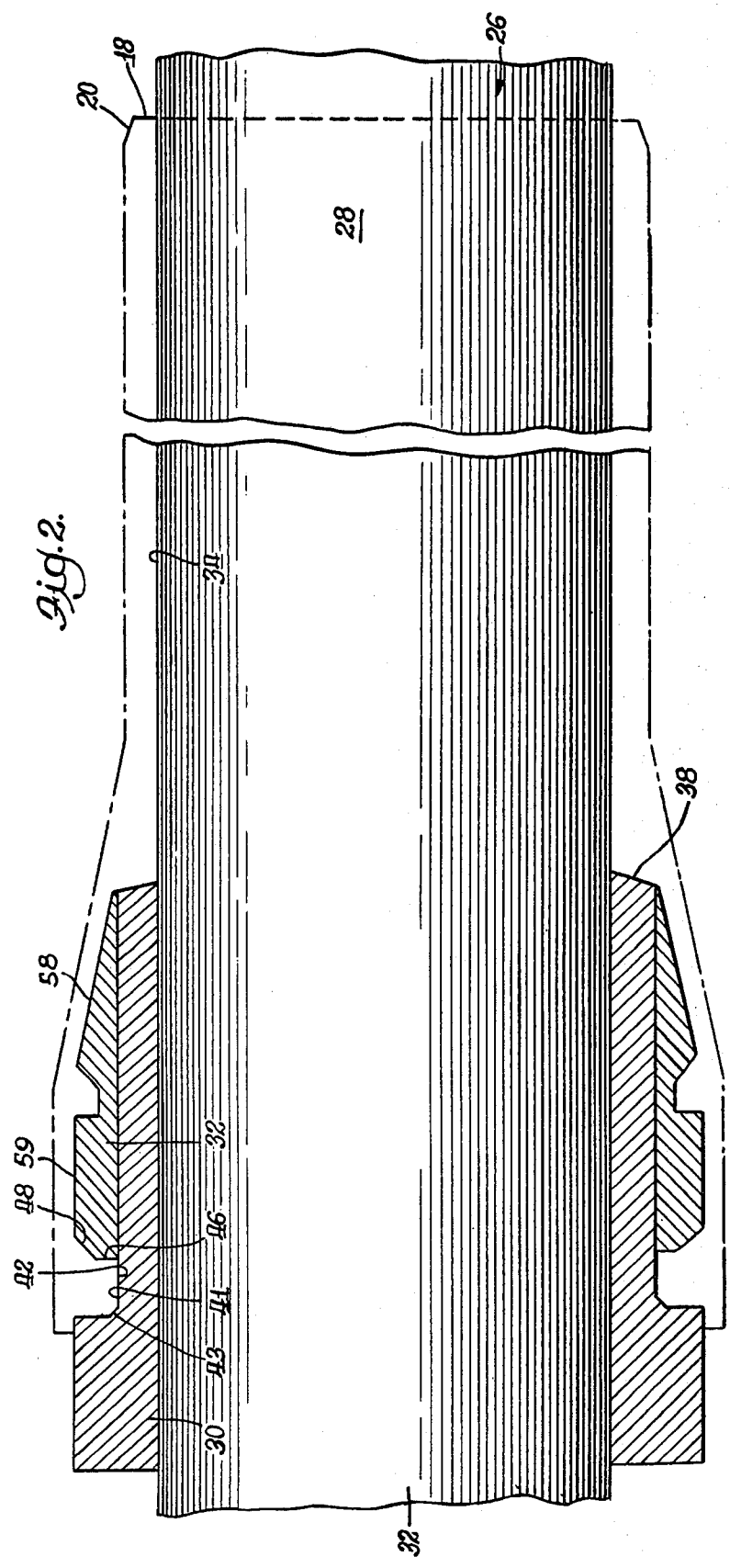

METHOD OF MAKING COMPOSITE PIPE HAVING AN INTEGRAL BELL END

This is a division, of application Ser. No. 879,158, filed Feb. 21, 1978, now U.S. Pat. No. 4,240,470.

The present invention relates generally to composite reinforced plastic pipe, and more particularly to a novel composite reinforced plastic pipe having an integral bell end adapted to receive the spigot end of a similarly configured pipe and defining a radial seal retaining groove therein.

It is known to make reinforced plastic pipe by continually winding suitable filamentary material about a mandrel to form a cylindrical tube, the filaments being impregnated with a curable resinous material either before application to the mandrel or during application to the mandrel, followed by curing of the wound impregnated filaments and removal of the mandrel. The filamentary material and curable resinous material generally comprise continuous glass fiber filaments and a suitable epoxy or polyester resin. When cured, the resulting pipe structure is relatively strong and corrosion resistant.

Reinforced plastic pipe of the aforenoted type is generally capable of withstanding substantial internal pressures due to the relatively high strength of the continuous glass fiber filaments. In underground applications requiring relatively large diameter pipe, such as in underground water or sewer lines, the wall thickness of the pipe necessary to withstand substantial external pressure loads due to ground loading must be significantly greater than would normally be necessary to withstand only the internal pressures encountered. In order to overcome the need for relatively thick walls in reinforced plastic pipe to withstand the external pressures encountered in underground lines, reinforced plastic pipe having a sandwich construction has been introduced. In sandwich pipe constructions, relatively thin coaxial layers of resin reinforced glass fiber filaments are radially spaced and have a plurality of core layers interposed between the resin reinforced fiber layers, the core layers providing sufficient wall dimension to withstand the external loads to which a pipe is subjected. Dry sand is frequently employed as the core material but exhibits a major drawback in that water migration takes place in the core with resulting breakdown of the core strength. It has been found that the use of certain premixed sand-resin mixtures for the core layer significantly enhance the bond between the core and the inner and outer resin reinforced glass fiber layers and also provide substantially greater resistance to water migration and core deterioration than sand alone.

One of the primary objects of the present invention is to extend the concept of a composite pipe having a sandwich construction with a sand-resin core to a high strength composite pipe having an integral bell end adapted to receive the spigot end of a similarly configured pipe so as to facilitated end-to-end connection of a plurality of pipe sections in forming a fluid flow line such as in sewer systems and the like.

Another object of the present invention is to provide a method of making a composite reinforced plastic pipe construction having an integral bell end, the pipe having a generally cylindrical tubular portion which includes a sand-resin core interposed between an inner resin impregnated continuous fiberglass strand reinforced layer and an outer resin impregnated continuous fiberglass strand reinforced layer, and wherein the bell end is formed by axial extensions of the inner and outer layers but does not have a core layer therein, whereby more uniform radial crush resistance is achieved.

A feature of the composite reinforced plastic pipe having an integral bell end in accordance with the invention lies in the provision of a resin impregnated surfacing veil and/or mat inner liner which substantially improves the chemical resistant characteristics of the composite pipe.

Another feature of the composite pipe in accordance with the present invention lies in the provision of a butting surface at the juncture of the bell end with the remaining cylindrical pipe length to abut the spigot end of a similarly configured pipe when inserted coaxially into the bell end.

Further objects and advantages of the present invention, together with the organization and manner of operation thereof, will become apparent from the following detailed description of the invention when taken in conjunction with the accompanying drawings wherein like reference numerals designate like elements throughout the several views, and wherein:

FIG. 1 is a foreshortened fragmentary longitudinal sectional view of a composite reinforced plastic pipe having an integral bell end constructed in accordance with the present invention, the pipe being shown in assembled relation with the spigot end of a similar pipe section and having a sealing gasket interposed coaxially between the bell end and mating spigot end; and FIG. 2 is a fragmentary longitudinal sectional view illustrating a mandrel assembly on which the pipe of FIG. 1 may be formed.

Referring now to the drawing, and in particular to FIG. 1, a foreshortened fragmentary longitudinal section of a composite reinforced plastic pipe having an integral bell end constructed in accordance with the present invention is indicated generally at 10. The composite pipe 10 includes a cylindrical tubular barrel portion, indicated generally at 12, and a bell end, indicated generally at 14, which is formed integral with the tubular barrel portion 12. The end of the tubular portion 12 opposite the bell end 14 defines a spigot end 16 having a planar end surface 18 and a chamfer or beveled edge surface 20 which, in the illustrated embodiment, has a bevel angle of approximately 20°. The chamfer 20 facilitates coaxial entry of the spigot end 16 into the bell end 14 of another substantially identical pipe section 10 for connecting a plurality of pipe sections end-to-end in the forming of a liquid flow system such as a sewer system. Such connection is illustrated in FIG. 1 by a tubular pipe portion 12' shown having its spigot end received within the bell end 14 of pipe 10, as will be described more fully hereinbelow. Each pipe section 10 is preferably made to a length of approximately 20 feet, although pipe sections of other lengths may be made. When employed in underground water and sewer lines, the composite reinforced plastic pipe 10 may be formed having a nominal diameter of approximately 15–144 inches.

The composite reinforced plastic pipe 10 includes an inner liner 22 which extends the full length of the barrel portion 12 of the pipe to a butting area 24 and is composed of a resin impregnated surfacing mat or veil having a thickness of approximately 10 to 30 mil. With reference to FIG. 2, the inner liner 22 is formed by wrapping the resin impregnated surfacing mat or veil about the full length of a mandrel assembly, indicated generally at 26. The mandrel assembly 26 includes a mandrel lead end 28, a mandrel adaptor portion 30 and an elastomeric mandrel portion 32. The mandrel lead end 28 has an outer cylindrical surface 34 over which the inner liner 22 is formed to establish an inner cylindrical surface 36 within the tubular barrel portion 12 of the composite pipe.

The mandrel adaptor portion 30 defines a frustoconical surface 38 which establishes a stop or butting surface 40 at the forward end of the butting area 24 as will be described in greater detail hereinbelow. The elastomeric bell forming portion 32 of the mandrel is received over a cylindrical surface 41 on the mandrel adaptor portion 30 and establishes the internal surface configuration of the bell end 14. The external cylindrical surface 41 on the mandrel adaptor portion 30 establishes a cylindrical entrance surface 42 in the bell end 14 having a diameter slightly greater than the outer diameter of the cylindrical spigot end 16. The external surface of the mandrel adaptor 30 is configured to establish a beveled entrance surface area 43 contiguous to entrance surface 42, and is also configured to establish an annular gasket receiving and retaining recess 44 within the bell end 14, the gasket receiving recess 44 of the illustrated embodiment being defined at its forward end by an annular radial surface 46 and an annular frustoconical surface 48, and being defined at its rearward end by an annular radial surface 50.

In the illustrated embodiment, the stop or butting surface 40 is frustoconical and has an internal conical angle of approximately 150°. The bell end 14 is formed with a longitudinal length, considered from the forward edge of the beveled lead-in surface 43 to the rear butting surface 40, of between approximately 6 to 7½ inches, varying in accordance with the nominal pipe diameter range of approximately 15-144 inches.

The inner liner 22 may be formed by wrapping a resin impregnated surfacing mat and/or veil along the length of the cylindrical surface 34 on the mandrel in edge butting relation so as to form a continuous integral inner veil liner 22. The inner veil liner serves to improve the corrosion resistance to the finished pipe 10.

After forming the inner liner 22 on the cylindrical surface 34 of mandrel 28, the butting area 24, alternatively termed the butt stop area, is formed on the outer surface of the inner liner 22 by applying a filled resin mixture or putty to build up the butting area to a configuration as shown in FIG. 1. The butting area 24 establishes the stop surface 40 and has a conical outer circumferential surface 54.

Following forming of the inner liner 22 and annular butt stop area 24 on the mandrel 26, a first or inner layer 56 of continuous fiberglass roving is helically wound on the outer exposed surfaces of the inner liner 22, butting area 24, elastomeric mandrel portion 32 and portions of the mandrel adaptor 30, as best seen in FIG. 2. The mandrel 26 is preferably provided with conventional means (not shown) for effecting selective rotation thereof about its longitudinal axis. The continuous fiberglass roving layer 56 comprises a plurality of elongate glass fiber strands impregnated with a suitable resin such as isophthalic polyester resin either before or during winding on the outer surface of the inner liner 22. The inner layer 56 preferably is formed by winding a plurality of layers of continuous fiberglass roving helically upon each other to build up a composite layer, it being noted that the layer 56 is built up or radially thickened by multiple layers of continuous fiberglass roving at 56a and 56b to create the gasket groove 44.

In making a composite pipe having a nominal inner diameter of 24 inches, the inner layer 56 is preferably formed by helically winding three layers of continuous fiberglass roving successively on the mandrel supported cylindrical inner liner 22, conical surface 54 on the butting area 24, and outermost surfaces 58 and 59 on the elastomeric mandrel portion 32. A combination of wind angles are used within the inner layer 56 to generate the amount of beam strength and hoop strength desired for the structure. The inner layer 56 is preferably formed by winding a continuous fiberglass roving having a yield of 247 yards per pound.

After forming the inner layer 56, a sand-resin core layer 60 is formed peripherally about the portion of the inner layer 56 defining the cylindrical tubular portion 12 of the pipe 10. The core 60 is of uniform radial thickness along the length of the tubular portion 12 and may be formed by a uniform deposit of the core material on the underlying inner layer 56 as it is rotated with the mandrel 26 in accordance with known techniques. The sand-resin core 60 preferably has a sand to resin weight ratio in the range of approximately 80:20 to 70:30. The sand used in the sand-resin composition of the core 60 is substantially pure silica having a purity of approximately 93% or better. The sand is preferably homogeneous in particle size distribution throughout the core and has an average particle diameter of 0.0112 inch (0.0285 cm). In the preferred embodiment, the sand may be selected so as to fall within the range of sand particle size set forth in the following table:

| Sieve Size U.S. No. | Percentage Retained | Sieve Opening |
|---|---|---|
| 40 | 3.0 | .0165 |
| 50 | 32.2 | .0117 |
| 70 | 51.7 | .0083 |
| 100 | 12.4 | .0059 |
| Pan | 0.7 | |

The resin employed in the sand-resin material comprising the core 60 may comprise any suitable polyester resin such as isophthalic polyester resin as available from Owens-Corning Corporation. The sand-resin composition is mixed so that the resin wets the sand thoroughly before the mixture is applied circumferentially about the inner layer 56.

An important feature of the pipe 10 in accordance with the present invention is that the sand-resin core 60 is not formed or continued along the length of the pipe into the area of the bell end 14. In this manner, the outer diameter of the bell end 14 may be maintained at a minimum increased diameter over the cylindrical tubular portion 12, and a more uniform longitudinal stiffness is obtained in the resulting pipe since the pipe stiffness of the joint is close to the stiffness of the pipe barrel. In the preferred embodiment, the core layer 60 is terminated at the juncture of the bell end with the cylindrical pipe portion 16.

After forming the core layer 60, which for a nominal 36 inch diameter pipe preferably has a radial thickness of approximately 0.44 inches, an annular layer 64 of randomly oriented, resin impregnated, surfacing mat or veil is applied over the length of the core layer 60. The surfacing veil layer 64 is preferably applied as an approximately 10 mil layer over the core layer 60.

After overwrapping the core with surfacing veil 64, an outer resin impregnated continuous fiberglass roving layer 68 is formed along the full longitudinal length of the core layer. The outer layer 68 has substantially identical composition to the inner layer 56; namely, being a continuous fiberglass roving having a yield of approximately 247 yards per pound. The outer layer 68 may be hoop wound along the length of the layer 64 so that adjacent edges of successive helical windings are in butt joined relation. In forming a composite pipe 10 having a 36 inch nominal diameter, the outer layer 68 preferably comprises three concentric layers of roving.

After forming the inner layer 22, butting area 24, inner layer 56, core layer 60, surfacing veil layer 64 and outer layer 68 as aforedescribed, the composite pipe is cured at a suitable curing temperature for a sufficient period of time to fully cure the resinous material throughout the various wound layers and core layer and effect the desired bonding between layers. It will be understood that the curing temperature and curing time may be varied in accordance with conventional techniques.

Following curing of the composite pipe, it is removed from the mandrel 26 and a thin, substantially uniform thickness clear gel coat layer 72 of known composition is applied, as by brushing, to the inner surface of the bell end from its outer end internally to the butt surface 40.

It is seen from FIG. 1, that the seal receiving recess 44 is adapted to receive and axially retain an annular elastomeric seal, such as indicated at 74, having an external configuration suitable to snugly engage the surfaces 46, 48 and 50 as well as the annular recess surface 44. The seal 74 is further adapted to be slightly compressed into sealing engagement with the external surface of the illustrated spigot end 12' of a second pipe section when inserted coaxially into the bell end 14 of the pipe 10. It is seen that the butting surface 40 serves to limit the extent of the insertion of the spigot end 12' into the pipe 10 whereby to establish a fixed relation therebetween.

The composite pipe thus formed provides a relatively lightweight, composite, flexible pipe having an integral bell end which includes an internal seal receiving recess adapted to retain a seal in sealing engagement with the spigot end of a mating pipe. By forming the sand-resin core layer so that it does not extend into the bell end of the pipe, more uniform longitudinal stiffness is obtained along the length of the pipe since the bell stiffness is nearly equal to the pipe stiffness.

While a preferred embodiment of a composite reinforced plastic pipe in accordance with the present invention and a preferred method of making same has been illustrated and described, it will be understood by those skilled in the art that changes and modifications may be made therein without departing from the invention in its broader aspects. Various features of the invention are defined in the following claims.

What is claimed is:

1. A method of making a composite reinforced plastic pipe having a generally cylindrical tubular portion defining a spigot end and an opposite integral bell end adapted to receive the spigot end of a similarly configured pipe therein; said method comprising the steps of forming an annular inner liner or resin impregnated surfacing veil defining an axial passage having a first tubular portion of substantially uniform cylindrical cross section, forming an annular butting area circumferentially of said inner liner adjacent said bell end so as to define an annular surface for abutment with the spigot end of a mating pipe inserted into said bell end, forming an inner layer circumferentially of said inner liner by winding a resin impregnated continuous fiberglass roving helically on the outer surface of said inner liner and continuing said inner layer axially beyond one end of said inner liner and said butting area to form a second tubular portion defining said bell end, said inner layer defining an internal annular seal receiving groove in said bell end, forming a core layer of sand-resin composition circumferentially about and directly on the outer peripheral surface of said inner layer, said core layer being of substantially uniform cross section and formed along the length of said first tubular portion but terminating at said bell end so as not to form a part of said bell end, said sand-resin composition having a sand to resin weight ratio in the range of approximately 80:20 to 70:30, forming an outer layer of a plurality of lays of resin impregnated continuous fiberglass roving circumferentially about said core layer and the exposed surface of said inner layer so as to cooperate with said inner layer in defining said bell end, and curing the resulting composite pipe to effect bonding between the various layers.

2. The method as defined in claim 1 wherein said bell end is formed with an annular internal radial recess adapted to receive and axially retain an annular seal therein.

3. The method as defined in claim 1 including the further step of forming a layer of randomly oriented, resin impregnated, surfacing veil over the outer exposed surfaces of said core layer and said inner layer prior to forming said outer layer.

4. The method of claim 3 wherein said layer of randomly oriented surfacing veil is applied as a 10 to 30 mil layer over the core.

5. The method of claim 3 including the step of applying a gel coat layer internally of the bell end of the composite pipe after curing thereof.

6. The method of claim 1 wherein said sand is substantially pure silica having a homogeneous average particle size diameter throughout said core layer of approximately 0.0112 inch (0.0285 cm.).

* * * * *